(Model.)

J. C. McFALL.
Grain Binder.

No. 235,270.

5 Sheets—Sheet 1.

Patented Dec. 7, 1880.

Witnesses:
J. S. Barker
L. H. Marshall

Inventor
Jay C. McFall
by H. H. Doubleday
Atty

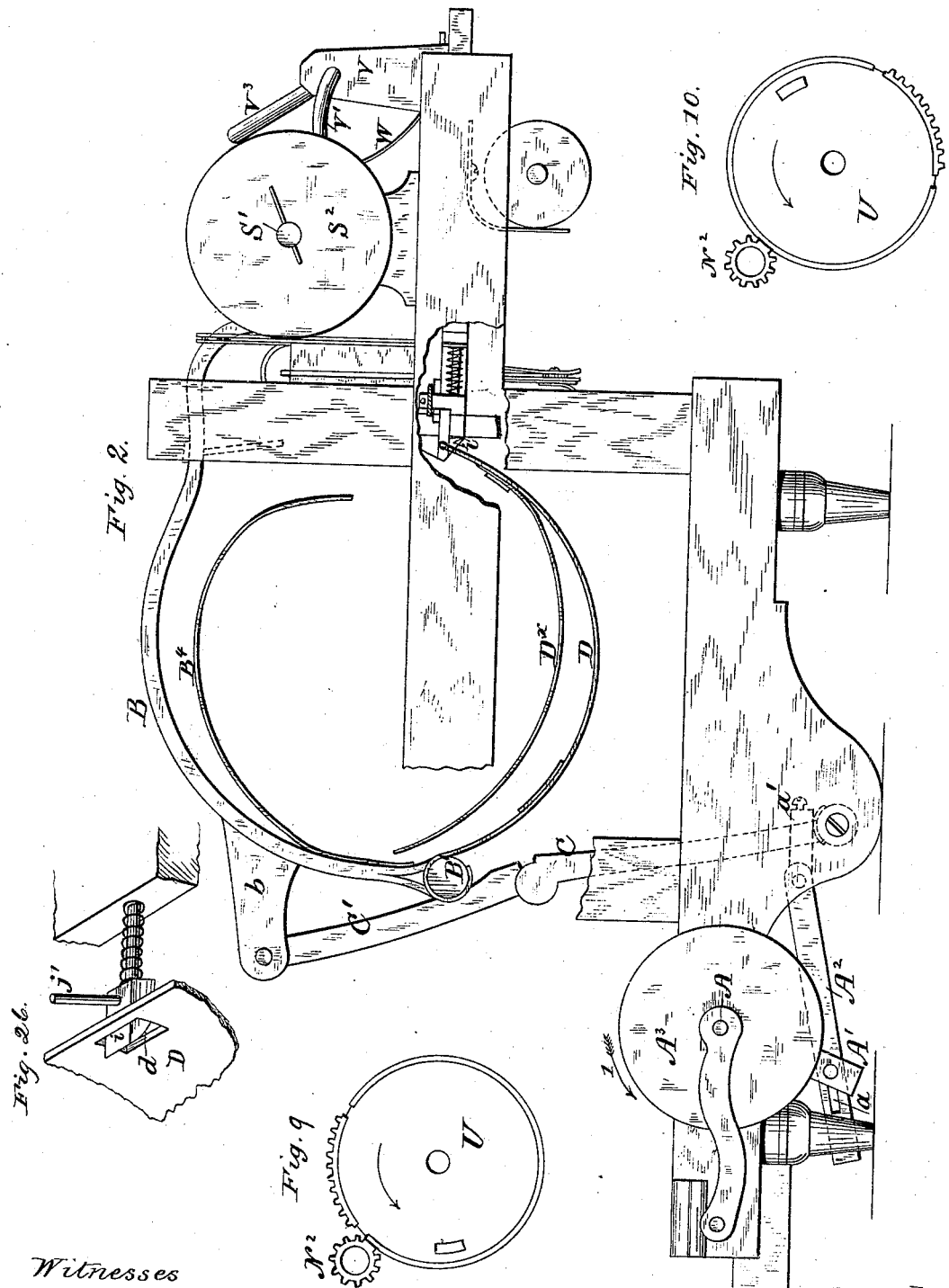

(Model.)

J. C. McFALL.
Grain Binder.

No. 235,270.

Patented Dec. 7, 1880.

5 Sheets—Sheet 3.

Witnesses
J. S. Barker
L. A. Marshall

Inventor
Jas C McFall
by H H Doubleday
atty (Model.)
J. C. McFALL.
Grain Binder.
No. 235,270.
5 Sheets—Sheet 4.
Patented Dec. 7, 1880.
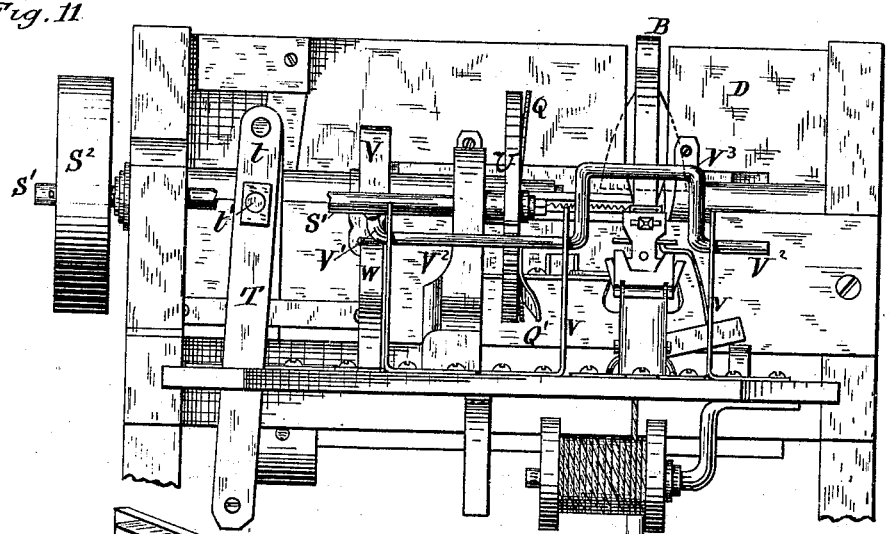
Fig. 11.
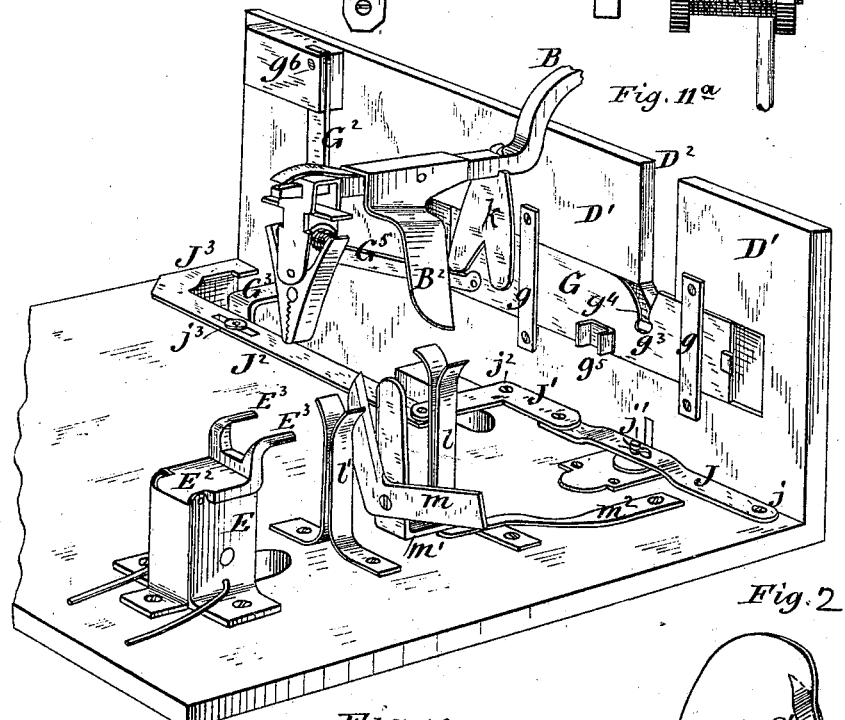
Fig. 11a.
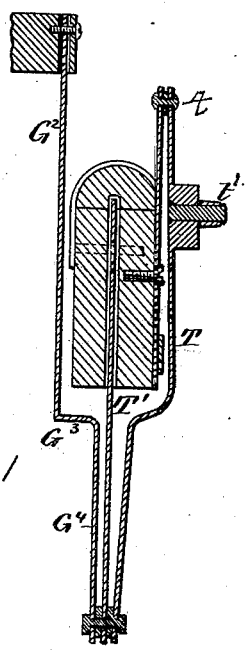
Fig. 20.
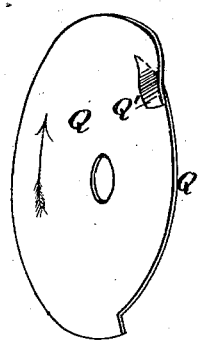
Fig. 21.
Fig. 19.
Witnesses:
J. S. Barker
L. H. Marshall
Inventor:
Jay C. McFall
by H. H. Doubleday
att.

(Model.)
J. C. McFALL.
Grain Binder.
No. 235,270.
5 Sheets—Sheet 5.
Patented Dec. 7, 1880.
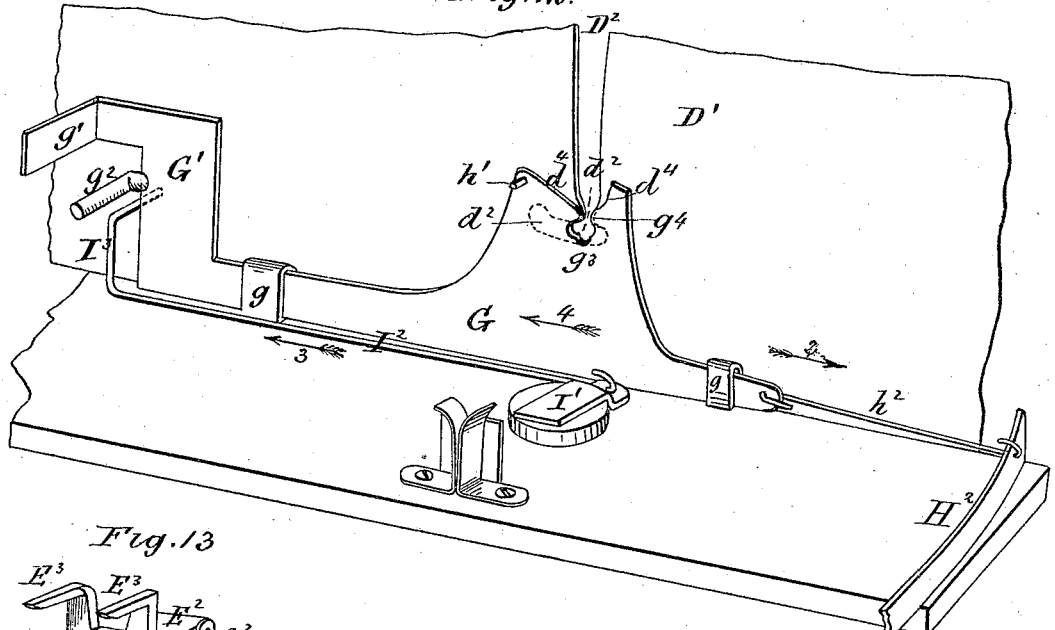
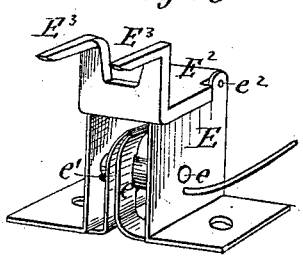
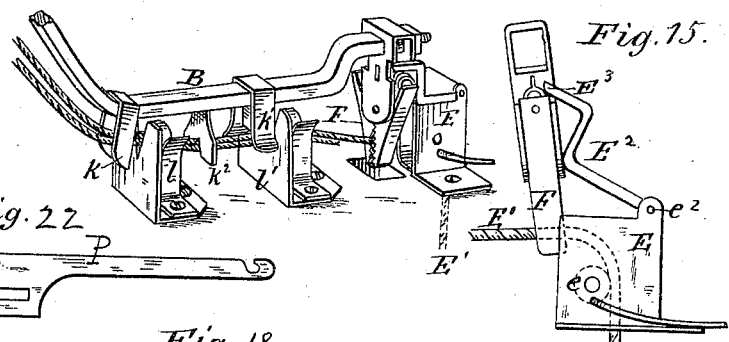
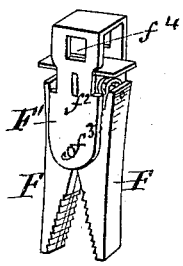
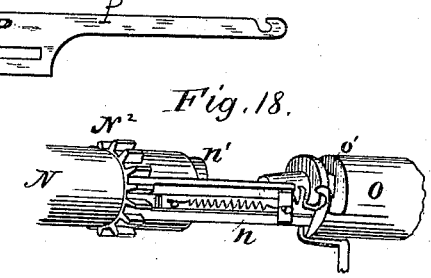
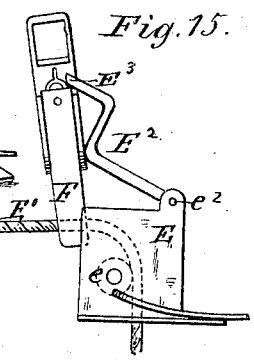
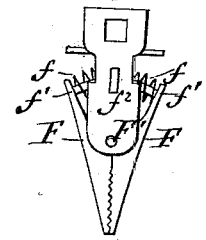
Witnesses:
J. S. Barker
L. H. Marshall
Inventor:
Jay C. McFall
by H. H. Doubleday
atty
N. PETERS, PHOTO-LITHOGRAPHER, WASHINGTON, D. C.

UNITED STATES PATENT OFFICE.

JAY C. McFALL, OF SANDUSKY, OHIO.

GRAIN-BINDER.

SPECIFICATION forming part of Letters Patent No. 235,270, dated December 7, 1880.

Application filed March 11, 1880. (Model.)

*To all whom it may concern:*

Be it known that I, J. C. McFALL, of Sandusky, in the county of Erie and State of Ohio, have invented certain new and useful Improvements in Grain-Binders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
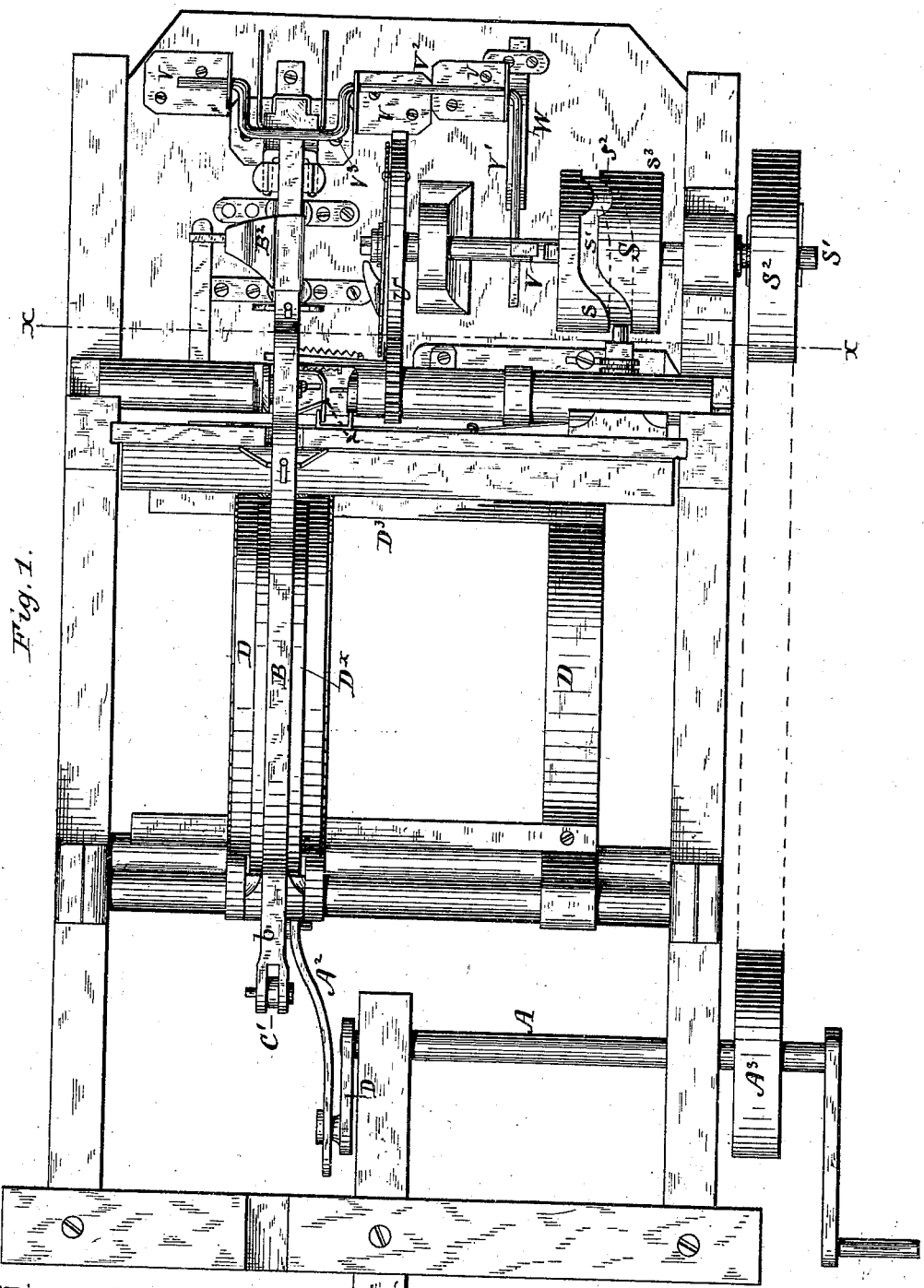
Figure 23:
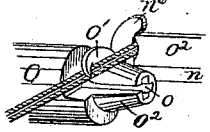
Figure 24:
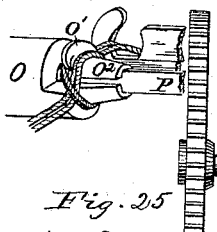
Figure 25:
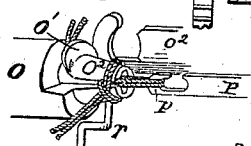
Figure 3:
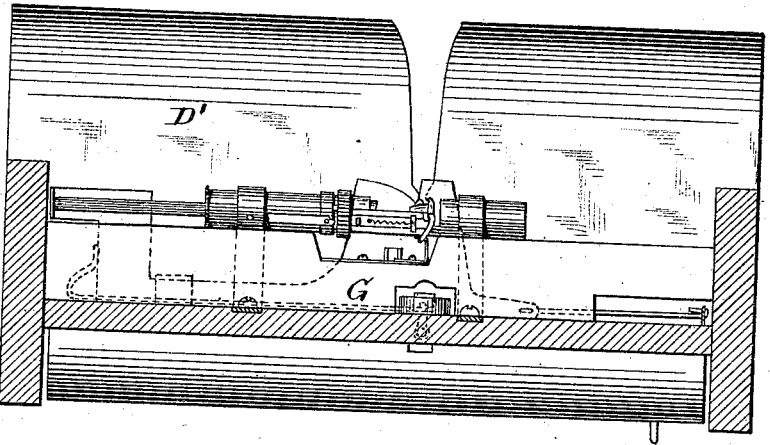
Figure 4:
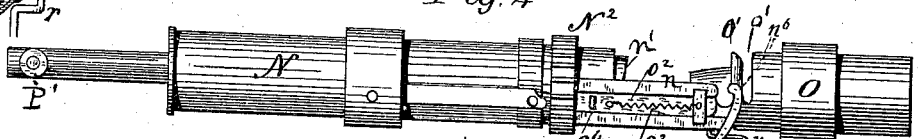
Figure 5:
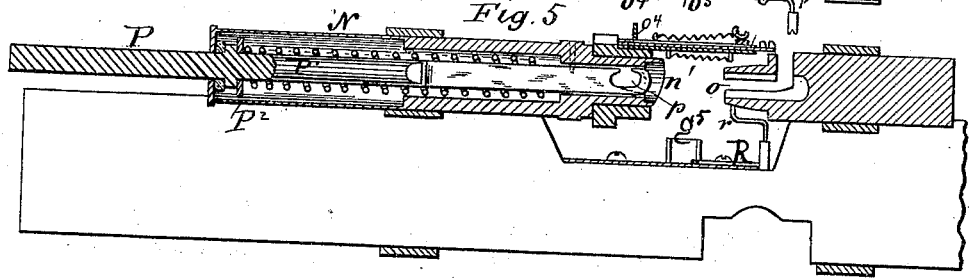
Figure 6:
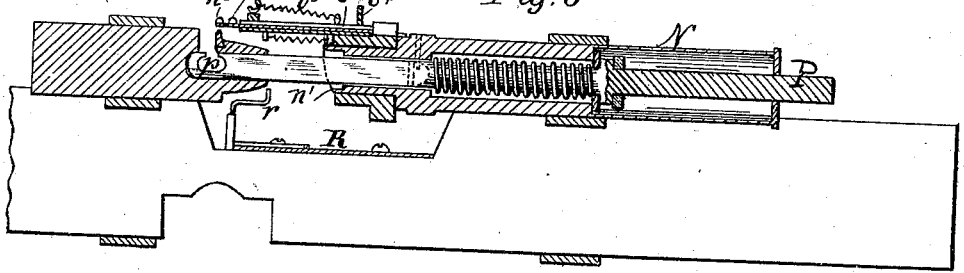
Figure 7:
Figure 8:
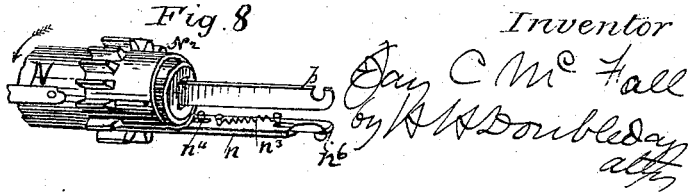

Figure 1 is the top or plan view of my improved binder. Fig. 2 is a side elevation. Fig. 3 is a vertical section taken on the line $x\ x$, Fig. 1, looking toward the grain-receiver, with the needle removed. Fig. 4 is a view, enlarged, of the knotting mechanism. Fig. 5 is a vertical section of the same. Fig. 6 is a vertical section of the same device shown in another position. Fig. 7 is a detached view of the looping-tube. Fig 8 is a detached view of the device which passes the cut end of the binding-cord around the looping-tube. Figs. 9 and 10 are side views of the mutilated gears which form a part of the knotting mechanism in different positions. Fig. 11 is a front view, one of the cams being removed. Fig. 11$^a$ is a detached view, in perspective, of a portion of the devices. Fig. 12 is a perspective view showing modifications of a portion of the mechanism shown in Fig. 11$^a$. Fig. 13 is a detached view of the tripper which actuates the cord-griper. Figs. 14, 15, and 16 are detached views of the clamping-jaws or gripers which carry the cord around the bundle. Fig. 17 is a detached view showing the relation of the cord-holding devices to each other when the needle is at the extreme of its forward or downward throw. Fig. 18 is a detached view, in perspective, of a part of the knotting mechanism. Fig. 19 is a detached view, enlarged, of one of the looping devices. Fig. 20 is a vertical section of the levers which actuate part of the knotting and clamping mechanism. Fig. 21 is a detached view of the warped plate. Fig. 22 is a detached view of the knotting-hook and its actuating-lever. Fig. 23 is a perspective of the looping-tube, the looping-hook, and the cord in their relative positions at the instant the loop is beginning to be formed. Fig. 24 is a perspective of the last-said parts and the knotting-hook in their relative positions at the instant the loop is finished. Fig. 25 is a view of the last-said parts just before the escape of the knot from the looping-tube. Fig. 26 is a view illustrating the tray and its latch.

A is a main driving-shaft, to which a rotary motion is imparted from any desired part of the reaper in the direction indicated by the arrow 1 in Fig. 2. It is mounted upon any desired support on the binder-frame, and in this application I shall refrain from describing in detail the specific manner in which the various parts are supported, as they may be mounted in any approved or convenient manner upon a common frame or bed-plate.

A' is a crank, attached to the inner end of the shaft A and connected, by means of a pitman, A$^2$, and adjustable clamp $a'$, to one member, C, of a toggle-lever. The other member, C', of the lever is pivoted to the heel-extension $b$ of the needle or cord-carrying arm B, which is pivoted upon the frame by means of a needle-shaft, B'. The pitman A$^2$ is slotted, as at $a$ in Fig. 2, the crank-pin entering this slot.

From an examination of the drawings it will be understood that a continuous rotation of the crank-shaft A in the direction indicated by the arrow will cause the needle B to vibrate about the needle-shaft B' as a center of motion.

B$^4$ is an elastic compressor-arm firmly attached at its rear end to the needle B, near its pivot end.

A grain-receiver in which grain is deposited while being bound is formed of the tray D, one edge of which is pivoted upon the needle-shaft B', and a shield portion, D', which is supported permanently in position, as in the drawings. This tray is, by preference, composed of a series of flat curvilinear arms, D D, attached at their front ends to a cross-bar, D$^3$, as indicated in Fig. 1; but it may be made of a continuous piece of metal, when preferred.

D$^\times$ is an elastic inclosing-arm attached at its forward end to the forward cross-bar, D$^3$, and lying in the path traversed by the toggle-lever C, which passes between two adjacent bars, D, of the tray, for a purpose which will be hereinafter explained.

From an examination of Fig. 2 it will be seen that I thus provide an elastic compressor-arm for both the upper and the lower sides of the gavel, and that by securing said compressor-arms in the manner described the free ends thereof are situated upon opposite sides of the gavel, and the secured ends are also upon sides opposite to each other, so that the pressure exerted by the arms upon the gavel is equally distributed.

I will now describe the devices for supplying cord to the binder, and for passing it (the cord) around the gavel, referring especially to Figs. 11, 11$^a$, 13, 14, 15, 16, and 17.

$e$ is a guide-roller mounted in uprights E E, which are placed a short distance apart, the cord E' being supplied from a suitable spool or other supply, and its delivery being controlled by any tension device before it reaches roller $e$. $e'$ are two elastic fingers between which the cord passes after leaving the roller. E$^2$ is a tripping-plate, pivoted at $e^2$ to uprights E, the forward end of the tripper being bent up at an angle to the portion pivoted to the uprights, and provided with angular jaws E$^3$, which project in a horizontal plane into the path traversed by the forward end of the needle. F F are the jaws of a cord-clamp, having their lower inner faces serrated or otherwise roughened, and thereby adapted to grasp the cord firmly. These jaws are pivoted centrally to a stirrup, F'.

$ff$ are springs interposed between the heel ends of the jaws, so as to spread these ends apart and press the roughened faces together, except when the heel ends are pressed toward each other, as will be explained.

By preference I provide the heel ends of the griping-jaws with inwardly-projecting pins $f'$ $f'$, to keep the springs in working position.

I preferably provide the stirrup F' with a central transverse rib or plate, $f^2$, which serves as an abutment or support for the inner ends of the springs $f$, and against which the inner ends of the pins $f'$ may strike, to insure that the lower ends of the jaws F shall both be opened to an equal distance from a vertical line drawn centrally through the pivot $f^3$. The stirrup F' is provided at its upper end with mortises $f^4$, which fit closely the squared outer end of the needle, which is shouldered to receive the stirrup, in which position it (the stirrup) is secured by a nut or pin.

By an examination of Figs. 1, 15, and 17, it will be understood that just before the needle reaches the limit of its forward and downward movements, the jaws of the cord-griper pass between the jaws E$^3$ E$^3$ of the tripper, and that thereby the roughened lower ends of the jaws are spread apart, as shown in Fig. 14. It will also be understood that when the outer end of the needle rises the tripper will swing upon its pivot and permit the griper to rise without actuating the jaws, so that they (the jaws) will retain their gripe upon the cord E' in their upward movement.

By means of knotting devices to be described I form the knot, after the cord which passes around the bundle is severed, from that which remains upon the spool, and in order to prevent the tension of the band from withdrawing the cut ends of the cord from the knotting mechanism while the knot is being tied I employ a friction-clamp constructed as follows: G is a plate interposed between the shield or guard D' and the knotting mechanism, and fitting closely the outer surface of said guard. This plate is supported, by means of brackets $g$, in such manner that it can be reciprocated freely, and be held in close contact with the shield D'.

I will now describe the mechanism by means of which the plate G has a reciprocating motion imparted to it for the purpose of clamping the cord while the knot is being tied, and of releasing the cord after it is tied, in order that the bound gavel may be discharged from the tray.

Referring to Figs. 1, 20, and 11$^a$, G$^2$ G$^3$ G$^4$ is a lever pivoted to the frame at $g^6$, the lower portion, G$^4$, of the lever occupying a plane parallel with the plane occupied by the upper part, G$^2$, but being supported at some distance from said plane by means of the bent portion G$^3$.

G$^5$ is a link pivoted to the part G$^2$ of the lever, and also to the clamping-plate G, (see Fig. 11$^a$,) whereby, when the lever G$^2$ G$^3$ G$^4$ is oscillated about its pivot $g^6$ said plate is reciprocated. Motion is imparted to the said lever from a cam-wheel, S, on shaft S' by intermediate connecting devices, to be hereinafter described.

The tray D is locked in position for supporting the bundle by the following means: A sliding latch, $i$, having its outer end beveled on the under side, is arranged on the supporting-frame in proper position to engage with the swinging side of the tray, and is thrust forward under the tray by a spiral spring when not withdrawn from the tray.

When, however, it is desired to dump a gavel the latch is withdrawn by the following mechanism: J is a lever pivoted at $j$ and connected with the latch by a pin, $j'$, the free end of said lever being connected to one arm of a bell-crank lever, J', which is pivoted at $j^2$, the other arm of the bell-crank lever being attached to a sliding bar, J$^2$, which lies upon the bed-plate of the binder, and is secured thereto by means of a bolt or set-screw passing through the slot $j^3$. The bar J$^2$ is provided with an L-shaped extension, J$^3$, which crosses the path of the lever G$^2$ G$^3$ G$^4$, and is actuated by said lever at the proper time, as will be hereinafter explained. After the tray has been dropped it is again returned to the proper position for receiving a gavel by means of the toggle-levers C C', which I prefer to so arrange that the lower member, C, shall bear against the bottom of the tray and lift or push it upward. The tray is hinged at one edge, as will be seen, and is locked in position by the latch $i$ engaging with it at the edge opposite to that where it is hinged, as shown in Figs. 2 and 26. Thus the tray is not only locked automatically in position, but it is also automatically released and automatically lifted by mechanism operated from a common motor.

The tray D is provided (preferably) with an aperture, $d$, near its swinging edge, through which aperture the latch $i$ can pass in its reciprocations.

$k$ is a cord-carrier, projecting from the under side of the needle, to present the cord to the tying and cutting mechanism. It may consist of arms projecting downwardly, as shown in Fig. 17, or of a plate having a notch in the lower edge to receive the cord, as shown in Fig. 11$^a$.

I sometimes prefer to use additional cord-carriers or guides similar to the one described, situated nearer the end of the needle than the guide indicated at $k$, as shown at $k'$ and $k^2$, Fig. 17.

$l\ l'$ are friction-clamps, arranged in the vertical plane of the path of the cord, as the cord is being wrapped around the bundle and delivered to the knotting mechanism, these clamps being arranged in such position as to receive the two strands of cord which are delivered to them by the cord-carriers $k\ k'\ k^2$. Each clamp consists of two elastic fingers secured to the frame or bed of the machine, and having their upper ends bent outward or away from each other, thus forming V-shaped openings to facilitate the introduction of the cord.

$m\ m'$ represent a cord-cutter arranged between the clamp $l'$ and the knotting mechanism.

As I propose to use any usual or well-known form of cord-cutter which is adapted to be operated by a direct thrust, it will not be necessary to show or describe it in detail, it being only important that its location relatively to the other parts of the mechanism should be stated, together with the devices which actuate it to sever the cord at the proper moment, in order to clearly understand my invention.

I will now describe the mechanism which I propose to employ for tying the knot, and which consists of the following parts, referring particularly to Figs. 4, 5, 6, 7, 8, 9, 10, and 11:

N is a sleeve or hollow support formed at one end, with a bearing adapted to receive and support a mutilated gear-pinion, N$^2$, which carries an arm, $n$, projecting from its vertical face near the periphery. The tubular bearing on which the pinion N$^2$ rotates extends beyond the face of the pinion and is formed into a cam, $n'$. (See Figs. 4, 5, 6, and 8.)

$n^2$ is a plate secured to the plate or arm $n$ by means of hooks or brackets, and is further connected with said arm by means of a spiral spring, $n^3$. (See Figs. 8 and 19.)

$n^4$ is a pin projecting upwardly from the rear end of plate $n^2$, through a slot in arm $n$, in such position as to engage with the working face of the cam $n'$, so that as the mutilated pinion N$^2$ is rotated upon the end of the tubular bar N in the direction indicated by the arrow in Fig. 8, a reciprocating motion is imparted to said plate $n^2$ and the hook $n^6$, by means of the cam $n'$, pin $n^4$, and spring $n^3$.

O is a looping-tube, provided with a central opening, $o$, and a circumferential opening or slot, $o'$, extending to about the center of the tube and communicating with the opening $o$.

O' is a semicircular flange formed upon tube O, the end O$^2$ of the tube, which projects beyond the flange, being tapering to facilitate the delivery therefrom of the loop, as will be hereinafter explained.

$o^2$ is a latch secured to and reciprocating upon the outside of the plate $n^2$, in such position that when its movement is unrestricted it crosses the open end of the hook, thereby making, practically, a closed hook or eye, which surrounds both strands of the cord, but does not prevent said strands from slipping through it while the loop and the knot are being formed.

Q is a cam-plate, mounted upon the shaft S' or attached to one face of a mutilated gear, U, to be described. A detached view of plate Q is shown in Fig. 21, where it will be seen a portion is cut away, as at Q$^2$, and that a lip, Q', is bent at an angle from the plane of the body of the plate.

By an examination of Figs. 1, 11, and 21, it will be understood that when the plate is revolving in the direction indicated by the arrow on said plate the lug $o^4$ on latch $o^2$, which projects into the path of plate Q, will be acted upon by the lip Q' in such manner as to withdraw the latch into the position shown in Fig. 4 and retain it (the latch) in such position while the lug $o^4$ is being traversed by that part of the wheel which is not cut out, as at Q$^2$, but that while that portion of the wheel which is of the reduced diameter, indicated at Q$^2$, is passing lug $o^4$ the spring $o^3$ will force the latch into the position shown in Fig. 5, and thus make, with the hook $n^6$, the tight eye above referred to.

P $p$ is a knotting-hook, square or rectangular in section, and fitting closely within a correspondingly-shaped recess or seat at each end of the tube N, so that it can slide freely therein endwise, but cannot be rotated therein relatively to the tube.

By an examination of Figs. 5 and 7 it will be seen that the opening $o$ in the looping-tube O is formed on lines substantially coincident with the line of reciprocation of the hook P. The end $p$ of the hook which enters the looping-tube is flat, while the opening $o$ in the looping-tube is in the form of a cross in cross-section, so that when the hook is in the opening $o$ there are grooves in the tube upon each side of the hook to receive the cord, as will be seen hereinafter. The end O$^2$ of the tube is tapered or cut away considerably, not only so that the loop can be withdrawn more easily therefrom, but also so that when the loop is being drawn therefrom it shall tighten gradually, and not with a sudden jerk, which would occur if it were withdrawn from a cylinder considerably larger in diameter than the knot.

$r$ is a stripper, the end or point of which is arranged to move in close proximity to the tapering end of the looping-tube. This stripper is attached to a sliding plate, R, an arm of which extends inwardly toward the sliding plate G and enters between the jaws $g^5$ projecting from plate G, so that a reciprocating motion is imparted to the stripper by means of said jaws.

Shaft S' carries a cam-wheel, S, provided with a groove, $s\ s'\ s^2\ s^3$, the part $s^3$ being shown in dotted lines in Fig. 1.

A lever, T, pivoted at $t$, carries a stud, $t'$, which enters the cam-groove, and is actuated thereby.

An arm, T', is pivoted at its lower end to lever T, and is connected at its upper end to the hook-rod P, so that as the shaft S' revolves, carrying with it the cam, a reciprocating motion is imparted to the hook-rod.

The pin which connects the lower end of lever T with arm T' also connects these two parts with the lower end, $G^4$, of the lever $G^2$ $G^3$ $G^4$, so that substantially the same motion is imparted to the sliding plate G as is imparted to the hook-rod, as will be readily understood by an examination of Figs. 11, 11$^a$, and 20.

U is a mutilated gear, also keyed to and rotating with shaft S', the diameter of this gear being about six times that of the pinion $N^2$, with which it engages.

Referring to Figs. 1 and 11, V is an arm projecting radially from shaft S'. V' $V^2$ $V^3$ is a rock-shaft mounted in brackets $v\ v\ v$, the crank portion $V^3$ being so located relatively to the path $f$ traversed by the end of the needle that said crank portion can be caused to engage with the upper side of the end of the needle under certain circumstances, to be hereinafter referred to.

The crank-arm V' is arranged in the traversed by the arm V as the shaft S' revolves.

W is a tongue-spring, arranged to engage with the under side of the crank-arm V', and hold the same up while it is not being acted upon by the arm V.

My binder may be operated as follows: Supposing the parts to be in the position represented in the Figs. 1, 2, 4, 9, and 17, a continued rotation of the shaft A and sprocket-wheel $A^3$ will produce an engagement of the mutilated gears, thus causing the arm $n$ and hook $n^6$ to pass around the looping-tube O, carrying with it the cut ends of the band, which have been severed by the cutters at a point between the cord-carrier $k$ and the griping-fingers $l'$ by the downward motion of the arm $B^2$, which engages with the angular arm of the cutter $m$ for that purpose just as the needle is completing its downward stroke.

When the hook $n^6$ travels around the projecting end of the tubular support N, the pin $n^4$ engages with the cam $n'$ on the inner end of said tubular support and forces the sliding plate toward the looping-tube O such distance as will insure that the cord, in being wrapped around the looping-tube, shall pass behind the flange O' into the throat $o'$ and also into the hook $p$, which, during this operation, remains in the position shown in Figs. 6 and 24. It will be understood that the sliding latch $o^2$ during this operation of wrapping the cut ends of the cord around the looping-tube has been released from the cam-plate Q, and has closed the throat of the hook, thereby forming a practically tight eye, which retains the cord properly within the hook $n^6$, to insure that the cut ends of the cord shall be wrapped around the looping-tube. As soon as this wrapping operation is completed and the hook $n^6$ has been returned to the position shown in Figs. 3, 4, and 24, the cam-wheel S engages with the stud which projects from the lever T and withdraws the knotting-hook $p$ into the position shown in Figs. 5 and 25, the cam-wheel S being now in the position shown in Fig. 1, thus drawing the cut end of the cord through the loop which has been formed by wrapping the cord around the looping-tube, and as the knotting-hook is withdrawn, the stripping-hook $r$ is advanced toward the end of the looping-tube O, for the purpose of slipping the loop off from the end of said tube, thus completing the knot. As the knot is being completed the clamping-plate G—which, as has been explained, is also actuated by the cam-wheel S—and the lever $G^2$ $G^3$ $G^4$ is moved in the direction indicated by arrow 4 in Fig. 12 such distance as will insure that the part $G^4$ of the lever shall engage with the part $J^3$ of link $J^2$, and actuate the bell-crank lever J' and lever J, so as to withdraw the latch $i$ from the swinging side of the tray and dump the bundle, the elongated slot $d^2$ in Fig. 12, insuring that the knot may pass through the shield D' freely. A continued rotation of the driving-shaft A moves the needle to the extreme of its backward throw, during which operation the upper end of the toggle-lever C is engaged with the flexible closing-bar or plate $D^\times$ and returns the tray to the position shown in Fig. 2, in order that it may receive grain from which to form a new gavel. As will be readily understood from an examination of Fig. 15, the needle in this latter movement has carried with it the cut end of the twine, so that the grain, which is now delivered into the tray for a new gavel, lies upon the cord which has been placed across the tray by this backward movement of the needle. The continued rotation of the driving-shaft carries the needle again forward, wrapping the cord around the bundle, and as the needle approaches the limit of its forward or downward throw the compressor $B^4$ bears upon the upper surface of the grain and compresses it into a compact gavel. Just before the needle reaches this limit of its forward throw the part $s^2$ of the groove in the cam-wheel S moves the plate G into the position shown in Figs. 11, 11$^a$, and 12, the knotting-hook being at this instant in the position shown in Fig. 6, so that the cord-carriers $k'$ $k^2$ carry both lines of cord into the openings $d^2$ $g^3$, also into the knotting-hook, and also between the clamps $l$ $l'$ and between the jaws of the cord-cutter, as will be readily understood by an examination of Figs. 3, 6, 11$^a$, and 17.

In order to assist the toggle-levers C C' in forcing the outer end of the needle down far enough to place the cord in proper position for cutting and tying and to cut off the cord, and also open the jaws to take a new hold on the cut end of the cord, I have so timed the movements of the arm V and rocking shaft V' V$^2$ that the crank-arm V$^3$ of said rocking shaft shall engage with the upper side of the outer end of the needle at the proper instant of time and force the needle down into the position shown in Fig. 17. Before the needle has reached this position (shown in Fig. 17) the plate Q on shaft S' has engaged with the pin $o^4$ which projects from the sliding latch into the path of said plate and has withdrawn said latch into the position shown in Fig. 4, and the cord-carriers have placed both lines of cord in the looping-hook before the cord is severed, and the continued rotation of the plate Q releases the sliding latch as soon as the cord is placed in the looping-hook, so that these parts are ready for further action.

By an examination of Figs. 1, 3, 11$^a$, and 12 it will be readily understood that after the part marked $s^2$ of the groove in cam-wheel S has passed the stud $t'$ projecting from lever T, the clamping-plate G is moved in the direction of arrow 2, Fig. 12, a short distance from the position of the plate shown in Fig. 12, the result being that a short bend is made in the cord, the said cord being bent between the shield D' and the clamping-plate, and said cord is so firmly griped between these parts as to effectually guard against the cut ends being withdrawn from the tying devices by the expansion of bundle around which the cord is drawn tightly.

A further rotation of the driving-shaft causes the multilated gears to engage with each other and repeat the operation of tying a knot, which has been described before, and need not therefore be repeated.

Figs. 23, 24, and 25 illustrate the positions occupied by the cord at the times, respectively, when the loop is beginning to be formed, immediately after the loop has been formed, and at the time of the completion of the knot.

In Figs. 3 and 12 I have shown a modification of the devices which actuate the clamping plate G, and the latch $i$, which locks the tray to receive the gavel. In these figures G' is an upward extension of the plate G, carrying two arms, $g'$ $g^2$, extending outwardly at about right angles to the vertical plane of the plate G and extension G'. $g^3$ is a circular opening in the upper portion of plate G, provided with a throat, $g^4$, adapted to receive the band, the slot in the plate above the throat $g^4$ being V-shaped, to assist in guiding the cord to the opening $g^3$.

A spring, H$^2$, is connected with plate G by means of a link, $h^2$, to move said plate in the direction indicated by arrow 2.

The clamping-plate just described (shown in Fig. 12) and the one shown in Fig. 11$^a$ are each situated in such manner that a portion of the plate is always upon each side of the slot D$^2$ in the shield D'. Therefore the cord is clamped, not by the end of the clamp G against one of the walls of the slot D$^2$, but by means of a side of the slot formed in the top or upper part of the clamping-plate G. The clamping-plate when thus formed enables me not only to secure the strands against the shield D', but also to slide them in the direction of the slot $d^2$, to assist in the withdrawal of the knot after it has been formed. Moreover, by combining with the shield D' a clamping-plate of the description set forth, having a slot in its upper edge, I am enabled to guide the cord into the clamping-slot by means of the throat with flaring edges $d^4$, which can be readily formed above the clamping-slot.

D$^2$ is a V-shaped opening in plate D', communicating at its lower end with a transversely-elongated slot, $d^2$, in the same horizontal plane with the opening $g^3$.

The tray is locked in position for supporting the bundle by the following means: A sliding latch, the outer end of which is beveled upon the under side, is supported in a case or shell and is actuated by a rotating plate, I', the shank of which projects into the shell, and is connected with the plate by any desired or approved kind of tumbler or cam in such manner that when the link I$^2$, which is connected with one side of the plate I', is moved in the direction indicated by the arrow 3 the latch is withdrawn from its engagement with the free edge of the tray, a spring serving to thrust the latch outward into the path of the edge of the tray when the angular arm I$^3$ of the link I$^2$ is not being acted upon by the upward extension G' of plate G.

The link I$^2$ is thrust in the direction indicated by arrow 3 at the proper instant to release the tray and drop the bundle after the band has been knotted. For the purpose of actuating these parts I dispense with the levers T G$^2$ G$^3$ G$^4$ and the arm T', and connect the hook-rod with the cam by means of a stud, P', projecting from the said hook-rod, (see Fig. 4,) the rear end of the rod engaging with the arm $g'$ of the upright part G' of plate G.

The part I$^3$ of the tripping-link projects into the path of the part G', so that when the plate is moved in the direction indicated by the arrow 4 to the extreme limit of its throw, it rotates plate I' and withdraws the tray-latch.

It will be seen that, in consequence of the pitman A$^2$ being slotted, the binder-arm pauses in the position shown in Fig. 17, while the knotting mechanism is doing part of its work.

I do not in this patent claim any invention except those specifically set forth in the claims, preferring to claim all other patentable features in another application, which I am preparing to file.

What I claim is—

1. In a grain-binder, the combination, with the sliding clamping-plate G, having slot $g^4$ in its upper edge. of the shield D′, provided with the opening $D^2$ and the slot $d^2$, substantially as set forth.

2. In a grain-binder, the combination, with the needle and griping-jaws F F, of the hinged tripper $E^2$ $E^3$, spring $f$, and pins $f'$, substantially as set forth.

3. In a grain-binder, the combination, with the needle and griping-jaws F F, of the hinged tripper $E^2$ $E^3$, spring $f$, pins $f'$, and plate $f^2$, substantially as set forth.

4. In a grain-binder, the combination of the needle, the griping-jaws, the clamp $l'$, and the fingers $e'$, substantially as set forth.

5. In a grain-binder, the combination of the latch $i$, the levers J J′, and bar $J^2$, the part $J^3$ being arranged in the path of the lever $G^2$ $G^3$ $G^4$, substantially as set forth.

6. In a grain-binder, the combination of the plate G, the lever $G^2$ $G^3$ $G^4$, link $G^5$, lever T, and the cam-wheel S, substantially as set forth.

7. In a grain-binder, the combination of the plate R, stripper $r$, plate G, and jaws $g^5$, substantially as set forth.

8. The combination, with the tray D, of the toggle-levers C C′, arranged, substantially as set forth, to return the tray after it has been dropped.

9. In a grain-binder, the combination of the tray D, the latch $i$, and the reciprocating cord-clamping devices arranged to release the tray-latch, substantially as set forth.

10. In a grain-binder, the combination, with the shield D′, provided with the slot $D^2$, extending to its upper edge, of the sliding clamping-plate G, having a slot in its upper edge adapted to receive the strands of the cord, substantially as set forth.

11. In a grain-binder, the combination, with a needle, of jaws F F, pivoted below their upper ends, and the hinged tripper having the arms $E^3$ $E^3$, arranged to inclose the jaws and force together their upper ends, substantially as set forth.

12. In a grain-binder, the combination, with the needle B, squared at its free end, and the jaws F F, of the stirrup F′, to which said jaws are pivoted, provided with a squared mortise, $f^4$, substantially as set forth.

13. In a grain-binder, the combination, with a looping-tube, of the tubular bearing N, mutilated gears U $N^2$, arm $n$, plate $n^2$, carrying hook $n^6$, spring $n^3$, and cam $n'$, substantially as set forth.

14. In a grain-binder, the combination, with the latch $o^2$, plate $n$, and pinion $N^2$, of the wheel U and cam-plate Q, carried by said wheel U and cut away, as at $Q^2$.

15. The combination, with the swinging tray D and the needle, of the elastic compressor-arm $B^4$, secured to the needle to have its free end nearer to the knotting mechanism than the fixed end, and the elastic compressor-arm $D^x$, secured to the tray to have its free end farther from the knotting mechanism than the fixed end, whereby the pressure of the compressor-arms is distributed around the gavel, substantially as set forth.

16. The combination of the sliding clamp G, the reciprocating hook P, the lever which actuates said clamp, the lever which reciprocates said hook, and the lever T, pivoted to both of last-said levers, substantially as set forth.

In testimony that I claim the foregoing I have hereunto set my hand and seal this 10th day of March, 1880.

JAY C. McFALL. [L. S.]

Witnesses:
JOHN W. WINTERSTEIN,
JAS. S. SWENEY.